(12) United States Patent
Uchikawa et al.

(10) Patent No.: US 8,457,310 B2
(45) Date of Patent: *Jun. 4, 2013

(54) PRINT SYSTEM, CONTROL METHOD THEREFOR, INFORMATION PROCESSING APPARATUS, CONTROL METHOD THEREFOR, PROGRAM FOR IMPLEMENTING THE CONTROL METHOD, AND STORAGE MEDIUM STORING THE CONTROL PROGRAM

(75) Inventors: Hiroshi Uchikawa, Yokohama (JP);
Yushi Matsukubo, Yokohama (JP);
Fumio Mikami, Chigasaki (JP);
Yoshinobu Umeda, Ohta-ku (JP);
Tadashi Kawaguchi, Shinagawa-ku (JP); Yoshio Kimura, Kawasaki (JP);
Yasuhiko Hirano, Yokohama (JP);
Hitoshi Imai, Machida (JP); Hiroyasu Morita, Kawasaki (JP)

(73) Assignee: Canon Kabushiki Kaisha (JP)

( * ) Notice: Subject to any disclaimer, the term of this patent is extended or adjusted under 35 U.S.C. 154(b) by 139 days.

This patent is subject to a terminal disclaimer.

(21) Appl. No.: 12/954,271

(22) Filed: Nov. 24, 2010

(65) Prior Publication Data

US 2011/0069338 A1 Mar. 24, 2011

Related U.S. Application Data

(63) Continuation of application No. 11/071,881, filed on Mar. 3, 2005, now Pat. No. 7,864,955.

(30) Foreign Application Priority Data

Mar. 3, 2004 (JP) .................................. 2004-058986

(51) Int. Cl.
*H04L 29/06* (2006.01)

(52) U.S. Cl.
USPC ............... 380/51; 380/43; 380/277; 713/162; 713/189; 358/1.13; 358/1.14; 358/1.15; 358/1.16

(58) Field of Classification Search
USPC .............. 380/43, 51, 277; 713/182, 189, 200, 713/201; 358/1.13–1.16
See application file for complete search history.

(56) References Cited

U.S. PATENT DOCUMENTS

| | | | |
|---|---|---|---|
| 6,378,070 | B1 | 4/2002 | Chan et al. |
| 7,224,447 | B2 | 5/2007 | Alexander et al. |
| 7,224,477 | B2 | 5/2007 | Gassho et al. |
| 2002/0032703 | A1 | 3/2002 | Gassho |
| 2004/0190714 | A1 | 9/2004 | Masui et al. |
| 2006/0053179 | A1 | 3/2006 | Imaizumi et al. |

FOREIGN PATENT DOCUMENTS

| | | |
|---|---|---|
| JP | 07-295892 A | 11/1995 |
| JP | 09-134264 A | 5/1997 |
| JP | 11-143658 A | 5/1999 |
| JP | 2003-039751 A | 2/2003 |

*Primary Examiner* — Jeffrey Pwu
*Assistant Examiner* — Hee Song
(74) *Attorney, Agent, or Firm* — Rossi, Kimms & McDowell LLP

(57) ABSTRACT

A print system which are capable of inhibiting simultaneous use of the encrypted print and the box storage to thereby increase the security of print data. A host computer has an encryption function of encrypting print data, and issues a print job for the print data encrypted by the encryption function. A print server receives the issued print job, and has a decryption function of decrypting the encrypted print data of the received print job. A printer has a storage function of storing the print data decrypted by the decryption function, and outputs the stored print data. At least one of the host computer and the print server inhibits simultaneous use of the encryption function and the storage function.

24 Claims, 8 Drawing Sheets

*FIG. 4A*        *FIG. 4B*
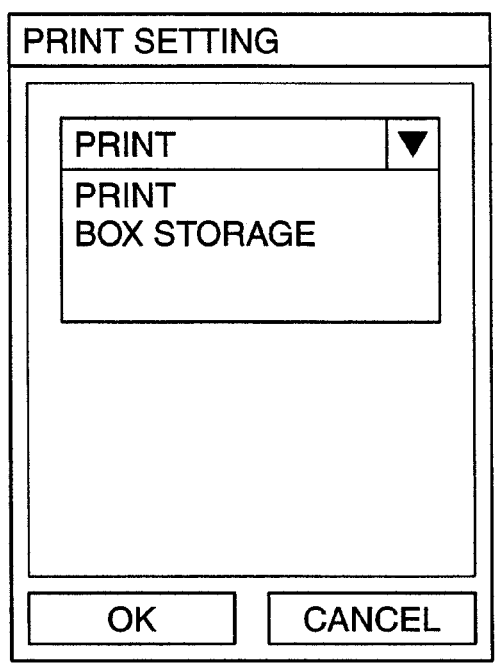
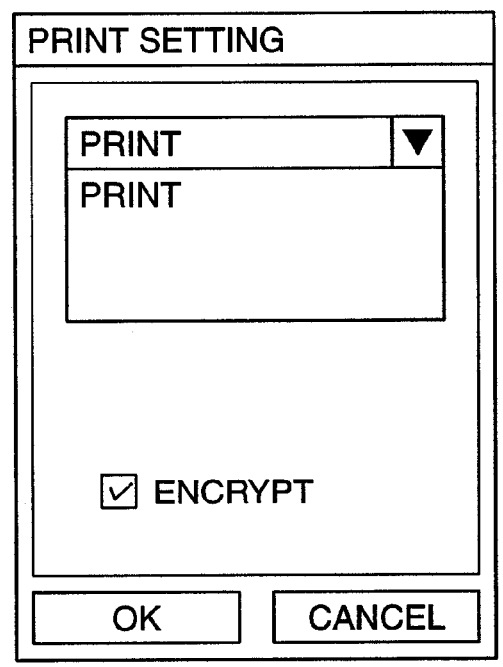

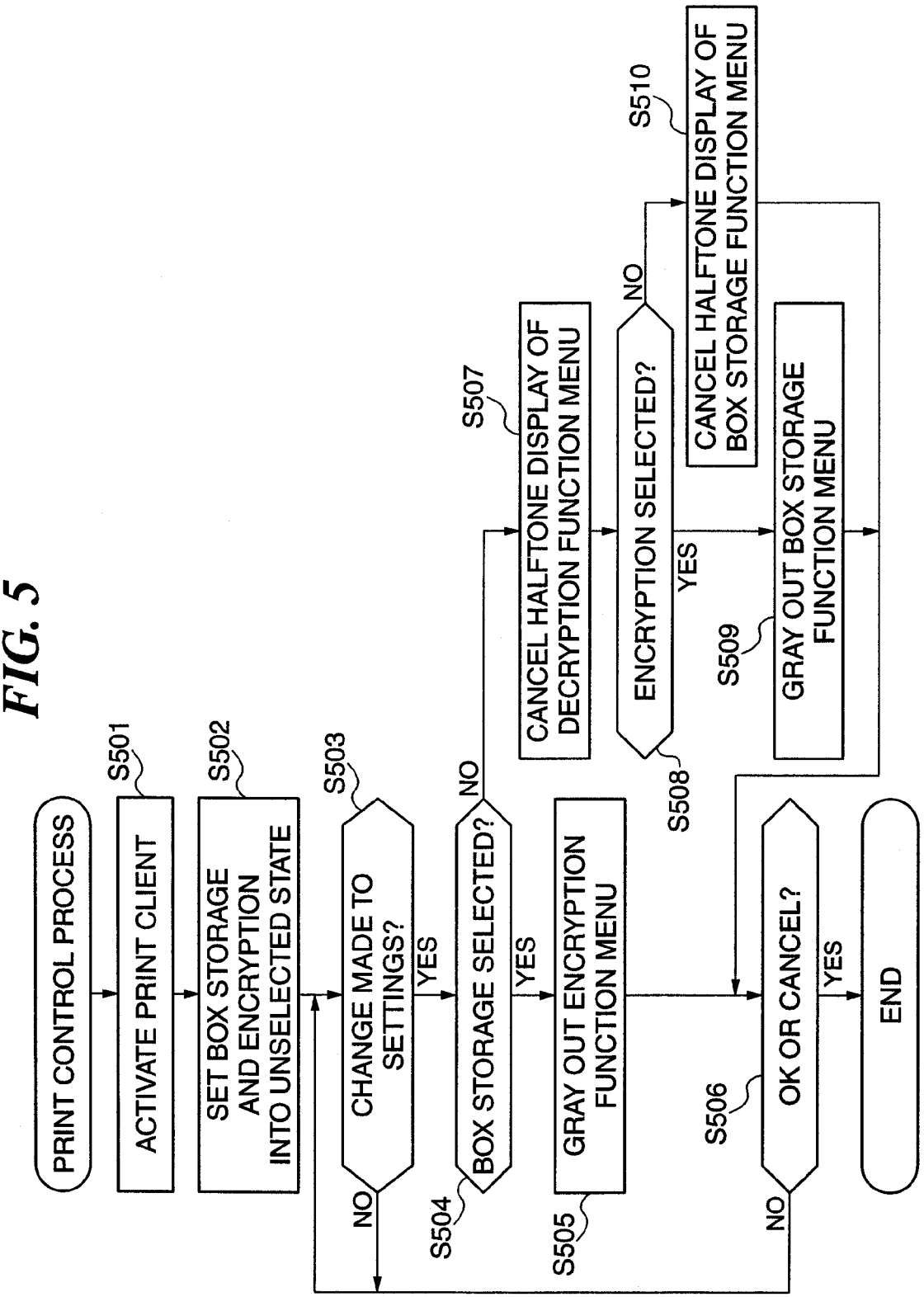

PRINT SYSTEM, CONTROL METHOD THEREFOR, INFORMATION PROCESSING APPARATUS, CONTROL METHOD THEREFOR, PROGRAM FOR IMPLEMENTING THE CONTROL METHOD, AND STORAGE MEDIUM STORING THE CONTROL PROGRAM

CROSS-REFERENCE

This is a continuation of application Ser. No. 11/071,881 filed Mar. 3, 2005, which claims priority to Japanese Patent Application No. 2004-058986 filed Mar. 3, 2004, the entire disclosures of which are incorporated herein by reference.

BACKGROUND OF THE INVENTION

1. Field of the Invention

The present invention relates to a print system, a control method therefor, an information processing apparatus, control method therefore, a control program for implementing the control method, and a storage medium storing the control program.

2. Description of the Related Art

In a conventional print system, there has been employed a technique referred to as "box storage", in which a host computer is caused to transmit print data, and an output apparatus is caused to store print data transmitted from the host computer in a storage device referred to as "a box" provided in the output apparatus for storage, and then to output the print data which is stored in the box. With the above technique, the output apparatus can repeatedly output the print data stored in the box to thereby save the time required for printing the same print data a plurality of times.

On the other hand, recently there have been demands for means for preventing wiretapping of print data upon transmission from a host computer to an output apparatus, means for protecting the print data inside the output apparatus, and means for preventing snooping of printed sheets output by the output apparatus by a third party. To meet such demands, there has been proposed a technique in which print data, which have been encrypted by a host computer using a password or an IC card of a user, are accumulated in an output apparatus, and the user instructs the output apparatus to finally output print data using the password or IC card used for the encryption (refer to Japanese Laid-Open Patent Publication (Kokai) No. H09-134264, for example). However, it is unrealistic in terms of the cost to install various types of IC card readers on the output apparatus depending on the customer environments. Moreover, there is a strong need for using an existing output apparatus to carry out a highly secure print without purchasing a new output apparatus.

To solve these problems, there has been proposed a technique referred to as "encrypted print", in which a host computer encrypts print data, and a print server accumulates the encrypted print data, decrypts the encrypted print data using a password or an IC card, and transmits the decrypted print data to an output apparatus. A transmission path between the print server and the output apparatus can be selected from a protected network, a Centronics cable, a USB cable, and the like according to the customer's desire, and it is thus possible to easily adapt to various customer environments and existing models.

However, with the technique of the encrypted print using the print server, since the print server transmits the decrypted print data to the output apparatus, it is useless to accumulate the print data encrypted by the host computer using a password or IC card in the output apparatus. As a result, if the print data designated to be subjected to the encrypted print is designated to be stored by the box storage, the print data is stored in a non-encrypted (plain text) state in the box. Consequently, a third party can operate the box to output the print data, or to transmit the print data by electronic mail or facsimile. There is thus a desire for a means which inhibits simultaneous use of the encrypted print and the box storage to increase the security of the print data.

SUMMARY OF THE INVENTION

It is an object of the present invention to provide a print system, a control method therefor, and an information processing apparatus, control method therefore, which are capable of inhibiting simultaneous use of the encrypted print and the box storage to thereby increase the security of print data, and a control program for implementing the control method, and a storage medium storing the control program.

To attain the above object, in a first aspect of the present invention, there is provided an print system comprising an information processing apparatus that has an encryption function of encrypting print data, and issues a print job for the print data encrypted by the encryption function, an output processing apparatus that receives the issued print job, and has a decryption function of decrypting the encrypted print data of the received print job, and an output apparatus that has a storage function of storing the print data decrypted by the decryption function, and outputs the stored print data, wherein at least one of the information processing apparatus and the output processing apparatus comprises an inhibiting unit that inhibits simultaneous use of the encryption function and the storage function.

With the above configuration, since either the host computer or the output processing apparatus inhibits simultaneous use of the encryption function and the storage function, it is possible to inhibit simultaneous use of the encrypted print and the box storage to thereby increase the security of the print data.

Preferably the information processing apparatus comprises a determining unit that determines whether or not the output processing apparatus has the decryption function, and a disabling unit that disables the storage function when the output processing apparatus has the decryption function.

Preferably the information processing apparatus comprises a designating unit that designates use of the encryption function and use of the storage function for the print job, and the output processing apparatus comprises a first detecting unit that detects whether or not the use of the encryption function is designated for the print job, a second detecting unit that detects whether or not the use of the storage function is designated for the print job, and a discarding unit that discards the print job when both the use of the encryption function and the use of the storage function are designated for the print job.

Preferably the information processing apparatus comprises a designating unit that permits a user to designate use of the encryption function or use of the storage function.

More preferably the information processing apparatus comprises a detecting unit that detects whether or not the use of the encryption function is designated, and a designation inhibiting unit that inhibits the designating unit from designating the use of the storage function when the use of the encryption function is designated.

More preferably the information processing apparatus comprises a detecting unit that detects whether or not the use of the storage function is designated, and a designation inhibiting unit that inhibits the designating unit from designating the use of the encryption function when the use of the storage function is designated.

More preferably the information processing apparatus comprises a first detecting unit that detects whether or not the use of the encryption function is designated, a second detecting unit that detects whether or not the use of the storage function is designated, and a notifying unit that notifies a user that simultaneous designation of the use of the encryption function and the use of the storage function is not permitted when simultaneous use of the encryption function and the storage function is designated.

To attain the above object, in a second aspect of the present invention, there is provided a control method for a print system including an information processing apparatus that has an encryption function of encrypting print data, and issues a print job for the print data encrypted by the encryption function, an output processing apparatus that receives the issued print job, and has a decryption function of decrypting the encrypted print data of the received print job, and an output apparatus that has a storage function of storing the print data decrypted by the decryption function, and outputs the stored print data, comprising an inhibiting step of causing at least one of the information processing apparatus and the output processing apparatus to inhibit simultaneous use of the encryption function and the storage function.

Preferably the control method for a print system comprises a determining step of determining whether or not the output processing apparatus has the decryption function, and a disabling step of disabling the storage function when the output processing apparatus has the decryption function.

Preferably the control method for a print system comprises a designating step of designating use of the encryption function and use of the storage function for the print job, a first detecting step of detecting whether or not the use of the encryption function is designated for the print job, a second detecting step of detecting whether or not the use of the storage function is designated for the print job, and a discarding step of discarding the print job when both the use of the encryption function and the use of the storage function are designated for the print job.

Preferably the control method for a print system comprises a designating step of permitting a user to designate the use of the encryption function or the use of the storage function.

More preferably the control method for a print system comprises a detecting step of detecting whether or not the use of the encryption function is designated, and a designation inhibiting step of inhibiting the designating step from designating the use of the storage function when the use of the encryption function is designated.

More preferably the control method for a print system comprises a detecting step of detecting whether or not the use of the storage function is designated, and a designation inhibiting step of inhibiting the designating step from designating the use of the encryption function when the use of the storage function is designated.

More preferably the control method for a print system comprises a first detecting step of detecting whether or not the use of the encryption function is designated, a second detecting step of detecting whether or not the use of the storage function is designated, and a notifying step of notifying a user that simultaneous designation of the use of the encryption function and the use of the storage function is not permitted when simultaneous use of the encryption function and the storage function is designated.

To attain the above object, in a third aspect of the present invention, there is provided a control program for a print system including an information processing apparatus that has an encryption function of encrypting print data, and issues a print job for the print data encrypted by the encryption function, an output processing apparatus that receives the issued print job, and has a decryption function of decrypting the encrypted print data of the received print job, and an output apparatus that has a storage function of storing the print data decrypted by the decryption function, and outputs the stored print data, comprising an inhibiting module for causing at least one of the information processing apparatus and the output processing apparatus to inhibit simultaneous use of the encryption function and the storage function.

To attain the above object, in a fourth aspect of the present invention, there is provided a computer-readable storage medium storing the control program as claimed in claim 15.

To attain the above object, in a fifth aspect of the present invention, there is provided an information processing apparatus that has an encryption function of encrypting print data, and issues a print job for the print data encrypted by the encryption function, the information processing apparatus being connected to an output processing apparatus that receives the issued print job, and has a decryption function of decrypting the encrypted print data of the received print job, and an output apparatus that has a storage function of storing the print data decrypted by the decryption function, and outputs the stored print data, the information processing apparatus comprising an inhibiting unit that inhibits simultaneous use of the encryption function and the storage function.

Preferably the information processing apparatus comprises a determining unit that determines whether or not the output processing apparatus has the decryption function, and a disabling unit that disables the storage function when the output processing apparatus has the decryption function.

Preferably the information processing apparatus comprises a designating unit that permits a user to designate use of the encryption function or use of the storage function.

More preferably the information processing apparatus comprises a detecting unit that detects whether or not the use of the encryption function is designated, and a designation inhibiting unit that inhibits the designating unit from designating the use of the storage function when the use of the encryption function is designated.

More preferably the information processing apparatus comprises a detecting unit that detects whether or not the use of the storage function is designated, and a designation inhibiting unit that inhibits the designating unit from designating the use of the encryption function when the use of the storage function is designated.

More preferably the information processing apparatus comprises a first detecting unit that detects whether or not the use of the encryption function is designated, a second detecting unit that detects whether or not the use of the storage function is designated, and a notifying unit that notifies a user that simultaneous designation of the use of the encryption function and the use of the storage function is not permitted when simultaneous use of the encryption function and the storage function is designated.

To attain the above object, in a sixth aspect of the present invention, there is provided a control method for controlling an information processing apparatus that has an encryption function of encrypting print data, and issues a print job for the print data encrypted by the encryption function, the information processing apparatus being connected to an output processing apparatus that receives the issued print job, and has a decryption function of decrypting the encrypted print data of the received print job, and an output apparatus that has a storage function of storing the print data decrypted by the decryption function, and outputs the stored print data, the control method comprising an inhibiting step of inhibiting simultaneous use of the encryption function and the storage function.

Preferably the control method for an information processing apparatus comprises a determining step of determining whether or not the output processing apparatus has the decryption function, and a disabling step of disabling the storage function when the output processing apparatus has the decryption function.

Preferably the control method for an information processing apparatus comprises a designating step of permitting a user to designate use of the encryption function or use of the storage function.

More preferably the control method for an information processing apparatus comprises a detecting step of detecting whether or not the use of the encryption function is designated, and a designation inhibiting step of inhibiting the designating step from designating the use of the storage function when the use of the encryption function is designated.

More preferably the control method for an information processing apparatus comprises a detecting step of detecting whether or not the use of the storage function is designated, and a designation inhibiting step of inhibiting the designating step from designating the use of the encryption function when the use of the storage function is designated.

More preferably the control method for an information processing apparatus comprises a first detecting step of detecting whether or not the use of the encryption function is designated, a second detecting step of detecting whether or not the use of the storage function is designated, and a notifying step of notifying a user that simultaneous designation of the use of the encryption function and the use of the storage function is not permitted when simultaneous use of the encryption function and the storage function is designated.

To attain the above object, in a seventh aspect of the present invention, there is provided a control program for controlling an information processing apparatus that has an encryption function of encrypting print data, and issues a print job for the print data encrypted by the encryption function, the information processing apparatus being connected to an output processing apparatus that receives the issued print job, and has a decryption function of decrypting the encrypted print data of the received print job, and an output apparatus that has a storage function of storing the print data decrypted by the decryption function, and outputs the stored print data, the control program comprising an inhibiting module for inhibiting simultaneous use of the encryption function and the storage function.

To attain the above object, in a eighth aspect of the present invention, there is provided a computer-readable storage medium storing the control program as claimed in claim 29.

The above and other objects, features, and advantages of the invention will become more apparent from the following detailed description taken in conjunction with the accompanying drawings.

BRIEF DESCRIPTION OF THE DRAWINGS

FIG. 4A is a view showing an example of a user interface displayed in a step S309 in the case where a print server does not have a decryption function;
FIG. 4B is a view showing another example of the user interface displayed in the step S309 in the case where the print server has the decryption function;
FIG. 5 is a flowchart showing a first variation of the print control process in FIG. 3.

DETAILED DESCRIPTION OF THE PREFERRED EMBODIMENTS

The present invention will now be described in detail with reference to the drawings showing a preferred embodiment thereof.

Figure 1:
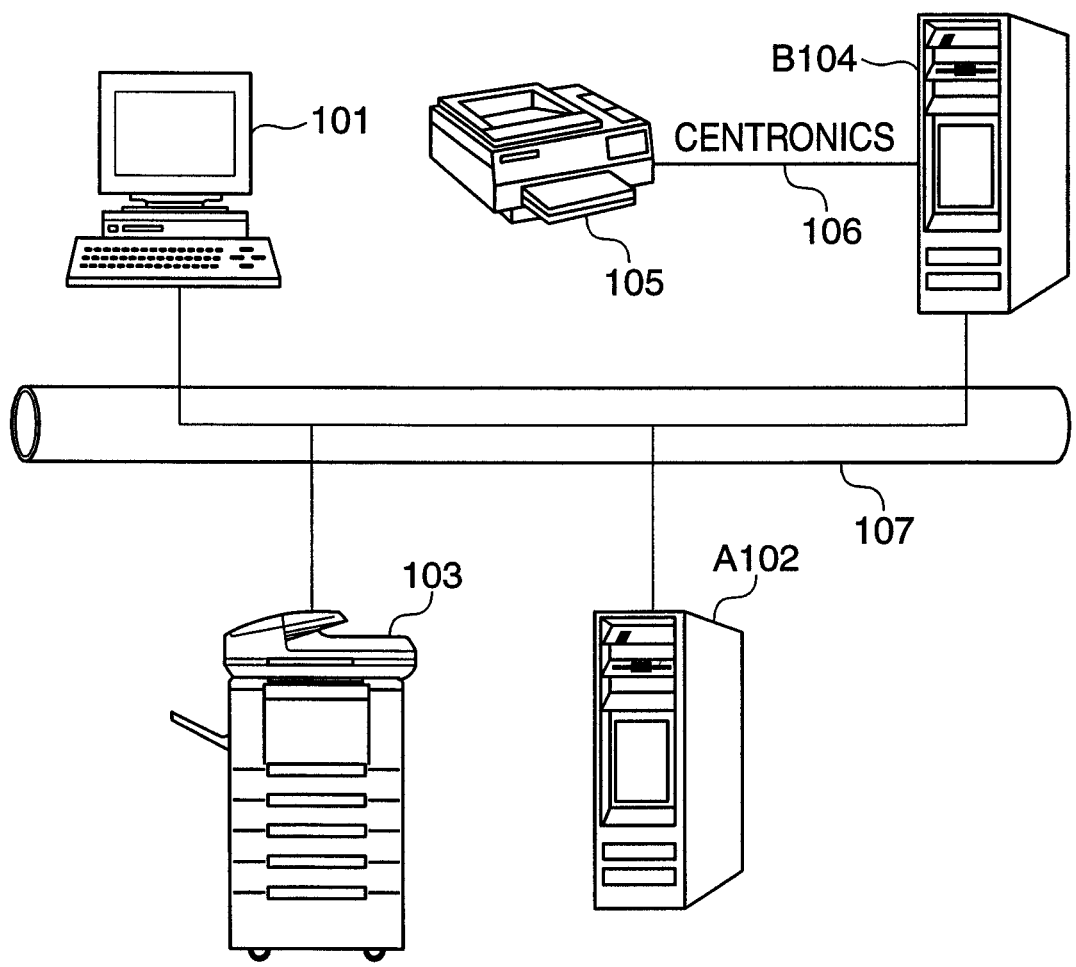
FIG. 1 is a diagram schematically showing the configuration of a print system according to an embodiment of the present invention.

FIG. 1 is a diagram schematically showing the configuration of a print system according to an embodiment of the present invention.

In FIG. 1, the print system 100 is comprised of a host computer 101 which activates a print client, as software, to encrypt print data using a password or an IC card, and then, to issue a print job of the encrypted print data, print servers A102 and B104 which receive and accumulate print jobs issued by the host computer 101, and then decrypt the print data of the print jobs using the password or the IC card, and a copying machine 103 which receives the print jobs output from the print server A102, then carries out printing according to the print jobs, and which includes a storage device.

The host computer 101, the print server A102, the copying machine 103, and the print server B104 are connected with each other via an Ethernet (registered trademark) 107 which serves both as a network and a transmission path for the print data.

The print system 100 is further comprised of a printer 105 which is connected to the print server B104 via a Centronics cable 106, receives a print job output from the print server B104, and which includes a storage device.

Although the print server A102 and the copying machine 103 are connected with each other via the Ethernet (registered trademark) 107, alternatively the print server A102 and the copying machine 103 may be connected via the Centronics cable 106 as is used for the connection between the print server B104 and the printer 105. The Centronics cable 106 may be replaced by another interface cable such as a USB (Universal Serial Bus) cable.

The print client, which is activated by the host computer 101, has an encryption function of encrypting print data, and then transmitting the encrypted print data to the print server A102, and a box storage function of causing the storage device of the copying machine 103 to store the encrypted print data. The print client can enable and disable the encryption function and the box storage function independently. Moreover, the print client displays a user interface for a user to set whether to use the encryption function or the box storage function. Further, the host computer 101 can issue a print job while designating the encryption function or the box storage function for executing the print job.

Figure 2:
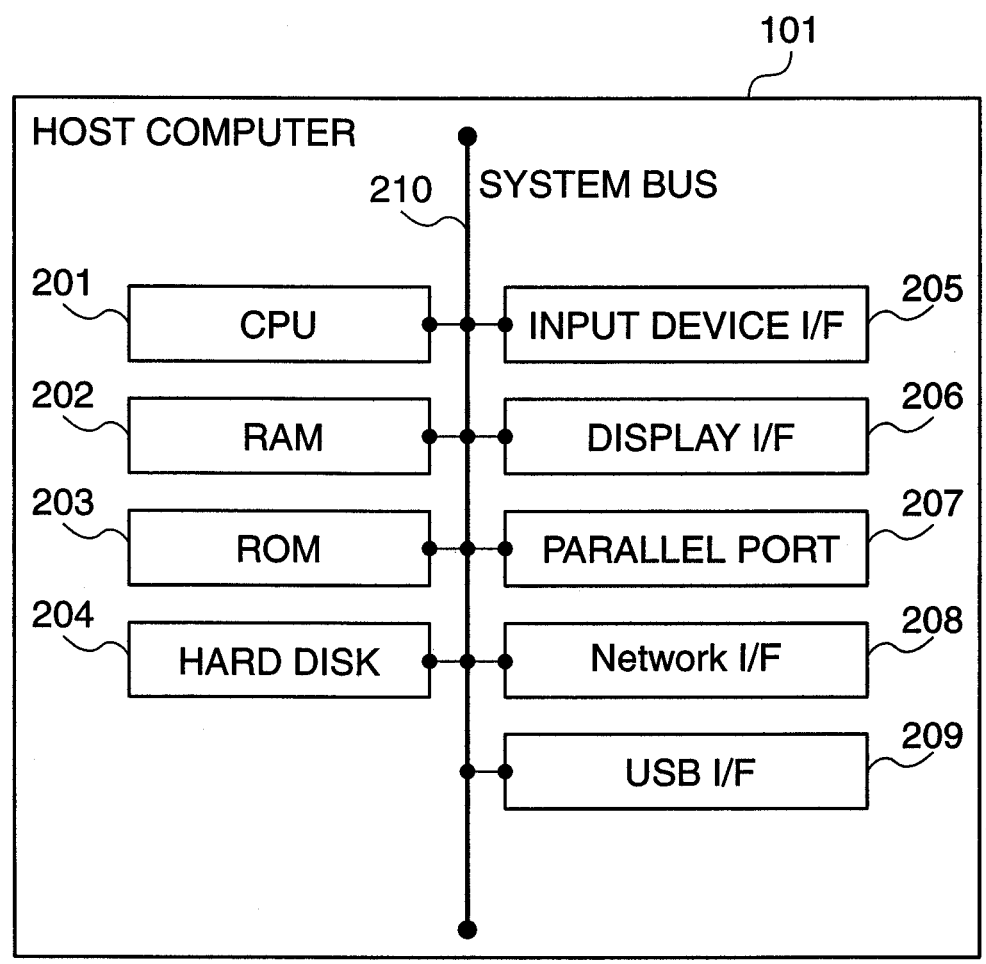
FIG. 2 is a block diagram schematically showing the internal configuration of a host computer appearing in FIG. 1.

FIG. 2 is a block diagram schematically showing the internal configuration of the host computer 101 in FIG. 1.

As shown in FIG. 2, the host computer 101 is comprised of a CPU (Central Processing Unit) 201 as a controller which controls the entire system, a RAM (Random Access Memory) 202 which is used as a work area for the CPU 201 and temporality stores print data, a boot ROM 203 which stores a boot program of the system 100, an HDD (Hard Disk Drive) 204 which stores system software and print data, an input device I/F (interface) 205 which serves as an interface with input devices such as a keyboard and a mouse, and transmits information input via the input devices by the user to the CPU 201, a display I/F 206 which serves as an interface with display devices such as a display monitor, and displays the information input by the user and information output by the CPU 201, a display I/F 206 which serves as an interface with display devices such as a display monitor, and displays the information input by the user and information output by the CPU 201, a parallel port 207 which serves as an interface with the printer 105, a network I/F 208 which serves as an interface with the Ethernet (registered trademark) 107, and inputs/outputs information, and a USB I/F 209 which serves as an interface with USB devices such as an IC card reader, which is not shown, and carries out authentication, and these components are connected with each other via a system bus 210.

The internal configurations of the print servers A102 and B104 in FIG. 1 are the same as that of the host computer 101.

Figure 3:
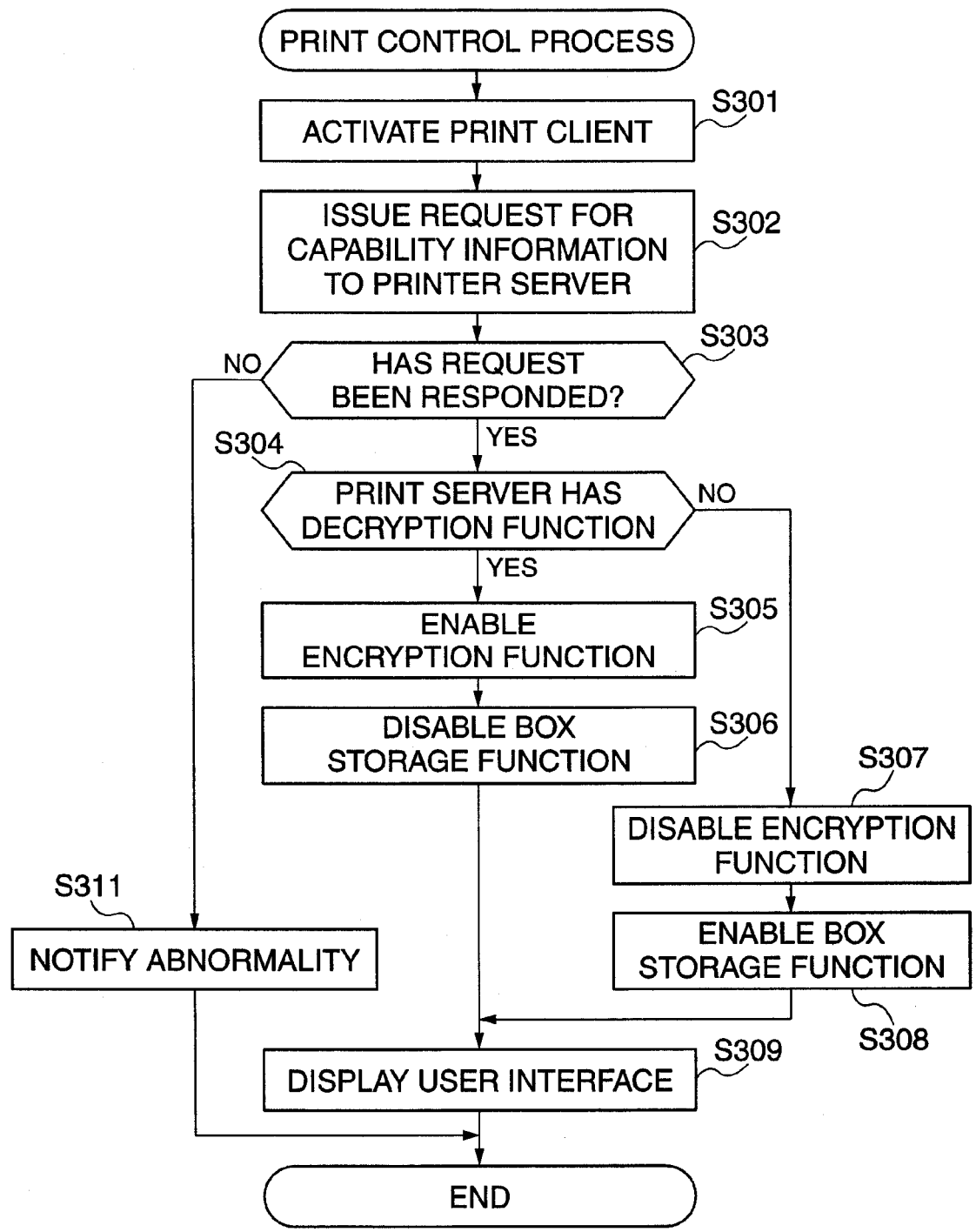
FIG. 3 is a flowchart showing a print control process executed by the host computer shown in FIG. 2.

FIG. 3 is a flowchart showing a print control process executed by the host computer 101 shown in FIG. 2.

As shown in FIG. 3, the host computer 101 activates the print client (step S301). When activated, the print client issues a request to the print server A102 for acquiring capability information indicating whether or not the print server A102 has the decryption function for decrypting encrypted data (step S302). It is determined whether or not the print server A102 has responded to the request for acquiring the capability information within a predetermined time period (step S303). If the print server A102 has not responded to the request for acquiring the capability information within the predetermined time period, the user is notified of an abnormality by means of a display on the display device via the display I/F 206 (step S311), and the process is terminated.

If it is determined period in the step S303 that the print server A102 has responded to the request for acquiring the capability information within the predetermined time period, it is then determined whether or not the print server A102 has the decryption function of decrypting encrypted data based on the capability information contained in the response (step S304). If it is then determined that the print server A102 has the decryption function, the encryption function of the print client is enabled (step S305), the box storage function is disabled accordingly (step S306), a user interface shown in FIG. 4, which will be described later, is then displayed (step S309), and the process is terminated.

If it is determined in the step S304 that the print server A102 does not have the decryption function, the encryption function of the print client is disabled (step S307), the box storage function is enabled accordingly (step S308), the processing of the step S309 et seq. is executed, and the process is then terminated.

FIG. 4A shows an example of the user interface displayed when it is determined in the step S304 in FIG. 3 that the print server A102 does not have the decryption function. On the displayed user interface, a menu for the box storage is shown, and a menu for the encrypted print is not shown.

FIG. 4B shows another example of the user interface displayed when it is determined in the step S304 in FIG. 3 that the print server A102 has the decryption function. On the displayed user interface, the menu for the box storage is not shown, and the menu for the encrypted print is shown.

According to the print control process in FIG. 3, when it is determined in the step S508 in FIG. 5 that the print server A102 has the decryption function ("YES" to the step S304), the encryption function of the print client is enabled (step S305), and the box storage function of the print client is disabled (step S306) at the same time. As a result, it is possible to prevent simultaneous use of the encrypted print and the box storage to thereby increase the security of the print data.

FIG. 5 is a flowchart showing a first variation of the print control process in FIG. 3.

As shown in FIG. 5, the host computer 101 activates the print client (step S501). When activated, the print client sets the box storage function and the decryption function into an unselected state, and displays a user interface shown in FIGS. 6A and 6B, described later, which is for setting the box storage function and the encryption function (step S502). It is then determined whether or not the user has changed the setting of the box storage function and/or the decryption function (step S503). If the user has changed the setting of the box storage function and/or the decryption function, it is determined whether or not the box storage function has been selected (step S504). If the box storage function has been selected, a menu for the encryption function is grayed out or displayed as a halftone image (step S505), and it is determined whether or not either an OK button or a Cancel button in FIG. 6 has been pressed (step S506). If neither the OK button nor the Cancel button has been pressed, the processing of the step S503 et seq. is repeated. On the other hand, if the OK button or the Cancel button has been pressed, a print job is issued based on the present setting, or the change of the setting is canceled, and the process is terminated.

If it is determined that the box storage function has not been selected in the step S504, the halftone display of the menu for the encryption function is canceled (step S507), and it is then determined whether or not the encryption function has been selected or not (step S508). If the encryption function has been selected, a menu for the box storage function is grayed out (step S509), the processing of the step S506 et seq. is executed, and the process is then terminated.

If it is determined that the encryption function has not been selected in the step S508, the halftone display of the menu for the box storage function is canceled (step S510), and the processing of the step S506 et seq. is executed, and the process is then terminated.

Figure 6A:
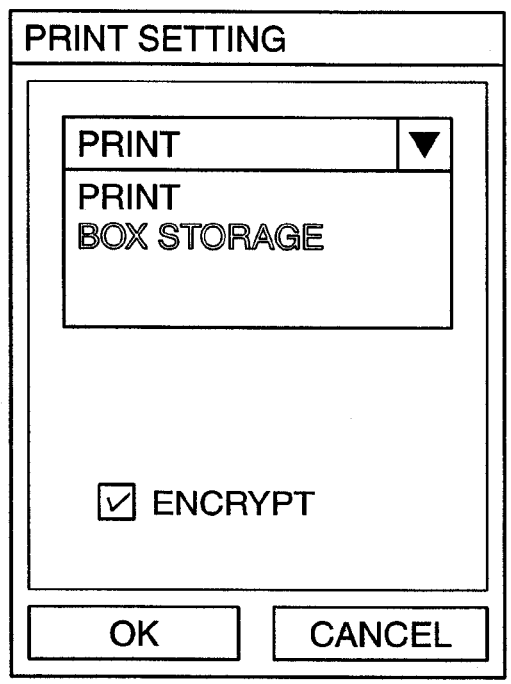
FIG. 6A is a view showing an example of a user interface displayed in a step S502 in the case where an encryption function is selected.

FIG. 6A shows an example of the user interface displayed when it is determined in the step S508 in FIG. 5 that the encryption function has been selected. On the displayed user interface, the menu for the box storage function is grayed out, and thus is not selectable.

Figure 6B:
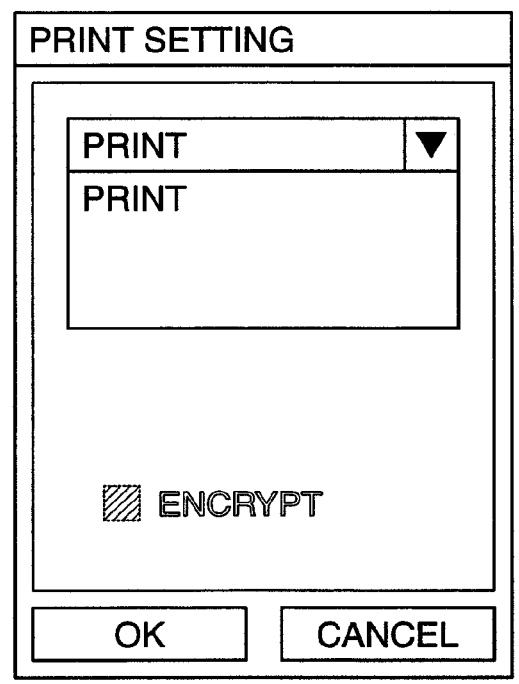
FIG. 6B is a view showing another example of the user interface displayed in the step S502 in a case where a box storage function is selected.

FIG. 6B shows another example of the user interface displayed when it is determined in the step S508 in FIG. 5 that the box storage function has been selected. On the displayed user interface, the menu for the encryption function is grayed out, and thus is not selectable.

According to the print control process in FIG. 5, when the box storage function has been selected ("YES" to the step S504), the menu for the encryption function is grayed out (step S505). On the other hand, when the encryption function has been selected ("YES" to the step S508), the menu for the box storage function is grayed out (step S509). It is thus possible to inhibit simultaneous use of the encrypted print and the box storage to thereby increase the security of the print data.

Figure 7:
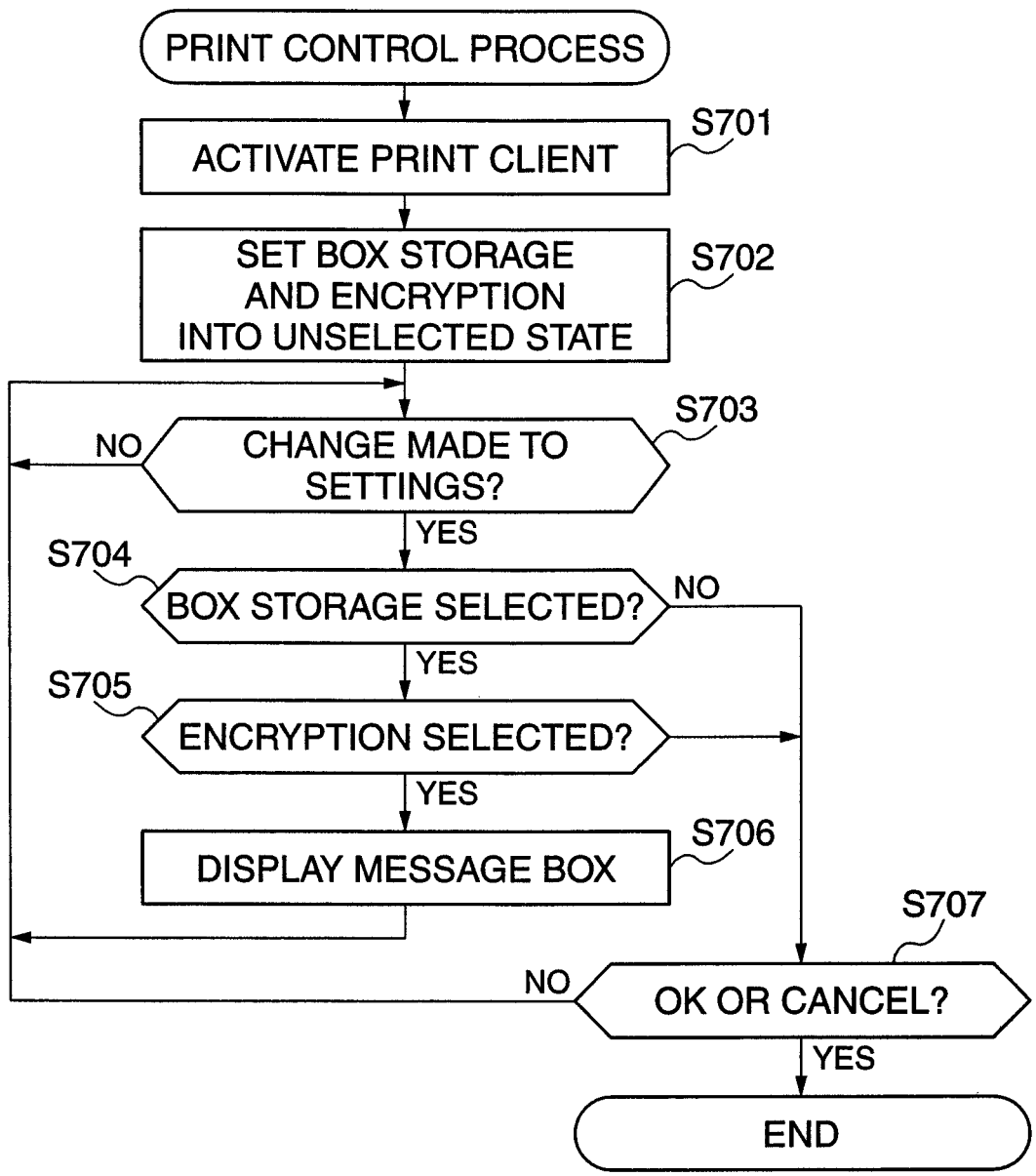
FIG. 7 is a flowchart showing a second variation of the print control process in FIG. 3.

FIG. 7 is a flowchart of a second variation of the print control process in FIG. 3.

As shown in FIG. 7, the host computer 101 activates the print client (step S701). When activated, the print client sets the box storage function and the decryption function into an unselected state, and displays a user interface for setting the box storage function and the encryption function (step S702). It is determined whether or not the user has changed the setting of the box storage function and/or the decryption function (step S703). If the user has changed the setting of the box storage function and/or the decryption function, it is determined whether or not the box storage function has been selected (step S704). If it is determined that the box storage function has been selected, it is determined whether or not the encryption function has been selected (step S705). If It is determined that the encryption function has been selected, a massage box shown in FIG. 8, described below, is displayed to notify the user that the encryption function and the box storage function cannot be used at the same time (step S706), and the processing of the step S703 et seq. is repeated.

If it is determined in the step S704 that the box storage function has not been selected, or it is determined in the step S705 that the encryption function has not been selected, it is determined whether or not an OK button or a Cancel button on a user interface, not shown, has been pressed (step S707). If neither the OK button nor the Cancel button has been pressed, the processing of the step S703 et seq. is repeated. If the OK button or the Cancel button has been pressed, a print job is issued based on the present setting, or the change of the setting is canceled, and the process is terminated.

Figure 8:
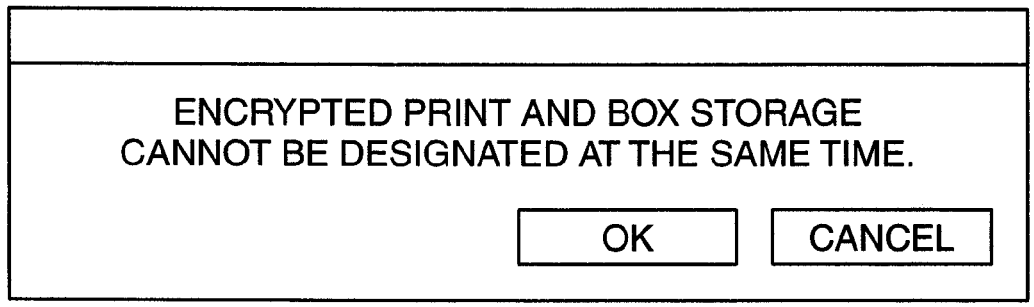
FIG. 8 is a view showing an example of a message box displayed in a step S706 in FIG. 7.

Although the massage box shown in FIG. 8 is displayed in the step S706 and the processing in the step S703 et seq. is repeated, alternatively, one of the designation of the encryption function and the designation of the box storage function may be forcibly canceled in the step S706, followed by the process proceeding to the step S707. Particularly, if the designation of the box storage function is forcibly canceled, it is possible to keep the security of the print data. Further, a massage box may be displayed to notify the user that one of the designation of the encryption function and the designation of the box storage function has been forcibly canceled.

FIG. 8 is a view showing an example of the message box displayed in the step S706.

Although the message box shown in FIG. 8 is used to notify the user that the encryption function and the box storage function cannot be used at the same time, a display on the status line may be used for the notification.

According to the print control process in FIG. 7, when the box storage function has been selected ("YES" to the step S704), and the encryption function has been selected at the same time ("YES" to the step S705), the message box which notifies the user that the encryption function and the box storage function cannot be used at the same time is displayed (step S706). It is thus possible to inhibit simultaneous use of the encrypted print and the box storage to thereby increase the security of the print data.

Figure 9:
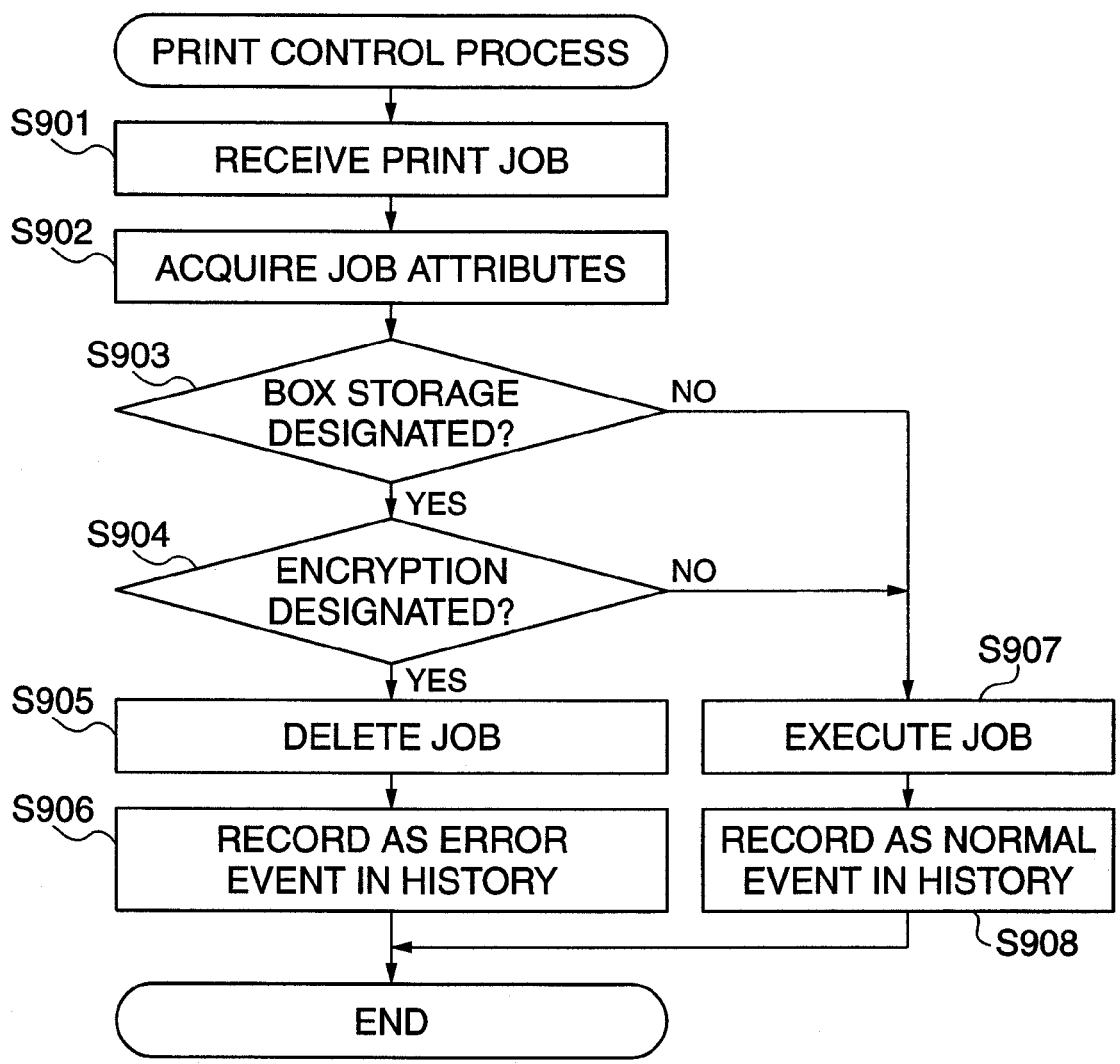
FIG. 9 is a flowchart showing a third variation of the print control process in FIG. 3.

FIG. 9 is a flowchart of a third variation of the print control process in FIG. 3.

As shown in FIG. 9, the host computer 101 causes the print server A102 to receive a print job (step S901), and acquire attributes of the received print job (step S902). It is determined whether or not the box storage is designated for the received print job, based on the acquired attributes (step S903). If the box storage is designated for the received print job, it is determined whether or not the encryption is designated for the received print job (step S904). If the encryption is designated for the received print job, the print job is deleted as an invalid print job (step S905), and this print job is recorded as an error event in the history (step S906), and the process is terminated.

If it is determined in the step S903 that the box storage is not designated for the received print job, or it is determined in the step S904 that the encryption is not designated for the received print job, the print job is executed (step S907), the print job is then recorded as a normal event in the history (step S908), and the process is terminated.

According to the print control process in FIG. 9, when the box storage is designated for the received print job ("YES" to the step S903), and the encryption is designated for the received print job ("YES" to the step S904) at the same time, the print job is deleted as an invalid print job (step S905). It is thus possible to inhibit simultaneous use of the encrypted print and the box storage to thereby increase the security of the print data.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided in an expansion board inserted into a computer or in an expansion unit connected to the computer and then causing a CPU or the like provided in the expansion board or the expansion unit to perform a part or all of the actual operations based on instructions of the program code.

The invention has been described with reference to certain preferred embodiments thereof. It will be understood, however, that modifications and variations of the described preferred embodiments are still possible within the scope of the appended claims. For example, certain functions performed by multiple elements may be combined into one element if so desired. As just one illustration of such a possibility, the output apparatus that receives the issued print job and provides the decryption function may be combined with the actual output apparatus that stores and outputs the print data as one device.

What is claimed is:

1. A print system comprising:
   an information processing apparatus that has an encryption function of encrypting print data, and issues a print job for the print data encrypted by the encryption function;
   an output processing apparatus that receives the issued print job, and has a decryption function of decrypting the encrypted print data of the received print job; and
   an output apparatus that has a storage function of storing the print data not encrypted by the encryption function, and outputs the stored print data,
   wherein the information processing apparatus comprises:
   a designating unit configured to permit a user to designate use of the encryption function and use of the storage function for the print job;
   a first detecting unit that detects whether or not the use of the encryption function for the print job is designated;
   a second detecting unit that detects whether or not the use of the storage function for the print job is designated; and
   a notifying unit that notifies a user that designation for using the encryption function for the print job and the storage function for the print job together is not permitted when the first detecting unit and the second detecting unit detect that both the use of the encryption function for the print job and the use of the storage function for the print job are designated.

2. A print system as claimed in claim 1, wherein said information processing apparatus comprises:
   a determining unit that determines whether or not said output processing apparatus has the decryption function for the print job, and
   a disabling unit that disables the storage function when the determining unit determines that said output processing apparatus has the decryption function for the print job.

3. A print system as claimed in claim 1, wherein said output processing apparatus comprises:
   a third detecting unit that detects whether or not the use of the encryption function for the print job is designated;
   a fourth detecting unit that detects whether or not the use of the storage function for the print job is designated; and
   a discarding unit that discards the print job when the third detecting unit and the fourth detecting unit detect that both the use of the encryption function for the print job and the use of the storage function for the print job are designated.

4. A print system as claimed in claim 1, wherein said information processing apparatus comprises a designation inhibiting unit that inhibits said designating unit from designating the use of the storage function for the print job when the first detecting unit detects that the use of the encryption function for the print job is designated.

5. A print system as claimed in claim 1, wherein said information processing apparatus comprises a designation inhibiting unit that inhibits said designating unit from designating the use of the encryption function for the print job when the second detecting unit detects that the use of the storage function for the print job is designated.

6. A print system as claimed in claim 1, wherein said information processing apparatus comprises a restricting unit configured to restrict from issuing, from the information processing apparatus to the output processing apparatus, the print job when the first detecting unit and the second detecting unit detect that both the use of the encryption function for the print job and the use of the storage function for the print job are designated by the designating unit.

7. A control method comprising:
   a providing step of providing a print system including an information processing apparatus that has an encryption function of encrypting print data, and issues a print job for the print data encrypted by the encryption function, an output processing apparatus that receives the issued print job, and has a decryption function of decrypting the encrypted print data of the received print job, and an output apparatus that has a storage function of storing the print data not encrypted by the encryption function, and outputs the stored print data;
   a designating step of permitting a user to designate use of the encryption function and use of the storage function for the print job;
   a first detecting step of detecting whether or not the use of the encryption function for the print job is designated;
   a second detecting step of detecting whether or not the use of the storage function for the print job is designated; and
   a notifying step of notifying a user that designation for using the encryption function for the print job and the storage function for the print job together is not permitted when the first detecting step and the second detecting step detect that both the use of the encryption function for the print job and the use of the storage function for the print job are designated,
   wherein the information processing apparatus executes the designating step, the first detecting step, the second detecting step, and the notifying step.

8. A control method as claimed in claim 7, further comprising:
   a determining step of determining whether or not the output processing apparatus has the decryption function for the print job; and
   a disabling step of disabling the storage function when the determining step determines that the output processing apparatus has the decryption function for the print job,
   wherein the information processing apparatus executes the determining step and the disabling step.

9. A control method as claimed in claim 7, further comprising:
   a third detecting step of detecting whether or not the use of the encryption function for the print job is designated;
   a fourth detecting step of detecting whether or not the use of the storage function for the print job is designated; and
   a discarding step of discarding the print job when the third detecting step and the fourth detecting step detect that both the use of the encryption function for the print job and the use of the storage function for the print job are designated,
   wherein the output processing apparatus executes the third detecting step, the fourth detecting step, and the discarding step.

10. A control method as claimed in claim 7, further comprising:
    a designation inhibiting step of inhibiting said designating step from designating the use of the storage function when the first detecting step detects that the use of the encryption function for the print job is designated,
    wherein the information processing apparatus executes the designation inhibiting step.

11. A control method as claimed in claim 7, further comprising:
    a designation inhibiting step of inhibiting said designating step from designating the use of the encryption function for the print job when the second detecting step detects that the use of the storage function for the print job is designated, wherein the information processing apparatus executes the designation inhibiting step.

12. A control method as claimed in claim 7, further comprising:
a restricting step of restricting from issuing, from the information processing apparatus to the output processing apparatus, the print job when the first detecting step and the second detecting step detect that both the use of the encryption function for the print job and the use of the storage function for the print job are designated in the designating step,
wherein the information processing apparatus executes the restricting step.

13. A non-transitory computer-readable medium storing a computer program for a print system including an information processing apparatus that has an encryption function of encrypting print data, and issues a print job for the print data encrypted by the encryption function, an output processing apparatus that receives the issued print job, and has a decryption function of decrypting the encrypted print data of the received print job, and an output apparatus that has a storage function of storing the print data not encrypted by the encrypting function, and outputs the stored print data, the computer program comprising:
a designating module for permitting a user to designate use of the encryption function and use of the storage function for the print job;
a first detecting module for detecting whether or not the use of the encryption function for the print job is designated;
a second detecting module for detecting whether or not the use of the storage function for the print job is designated; and
a notifying module for notifying a user that designation for using the encryption function for the print job and the storage function for the print job together is not permitted when it is detected that both the use of the encryption function for the print job and the use of the storage function for the print job are designated.

14. An information processing apparatus that has an encryption function of encrypting print data, and issues a print job for the print data encrypted by the encryption function, the information processing apparatus being connected to an output processing apparatus that receives the issued print job, and has a decryption function of decrypting the encrypted print data of the received print job, and an output apparatus that has a storage function of storing the print data not encrypted by the encrypting function, and outputs the stored print data, the information processing apparatus comprising:
a designating unit configured to permit a user to designate use of the encryption function and use of the storage function for the print job;
a first detecting unit configured to detect whether or not the use of the encryption function for the print job is designated;
a second detecting unit configured to detect whether or not the use of the storage function for the print job is designated; and
a notifying unit that notifies a user that designation for using the encryption function for the print job and the storage function for the print job together is not permitted when the first detecting unit and the second detecting unit detect that both the use of the encryption function for the print job and the use of the storage function for the print job are designated.

15. An information processing apparatus as claimed in claim 14, further comprising:
a determining unit that determines whether or not the output processing apparatus has the decryption function for the print job; and
a disabling unit that disables the storage function when the determining unit determines that the output processing apparatus has the decryption function for the print job.

16. An information processing apparatus as claimed in claim 14, further comprising a designation inhibiting unit that inhibits said designating unit from designating the use of the storage function for the print job when the first detecting unit detects that the use of the encryption function for the print job is designated.

17. An information processing apparatus as claimed in claim 14, further comprising a designation inhibiting unit that inhibits said designating unit from designating the use of the encryption function for the print job when the second detecting unit detects that the use of the storage function for the print job is designated.

18. An information processing apparatus as claimed in claim 14, further comprising a notifying unit that notifies a user that designation of both the use of the encryption function for the print job and the use of the storage function for the print job is not permitted when the first detecting unit and the second detecting unit detect that both the use of the encryption function for the print job and the use of the storage function for the print job are designated.

19. A control method comprising:
a providing step of providing an information processing apparatus that has an encryption function of encrypting print data, and issues a print job for the print data encrypted by the encryption function, the information processing apparatus being connected to an output processing apparatus that receives the issued print job, and has a decryption function of decrypting the encrypted print data of the received print job, and an output apparatus that has a storage function of storing the print data not encrypted by the encrypted function, and outputs the stored print data;
a designating step of permitting a user to designate use of the encryption function and use of the storage function for the print job;
a first detecting step of detecting whether or not the use of the encryption function for the print job is designated;
a second detecting step of detecting whether or not the use of the storage function for the print job is designated; and
a notifying step of notifying a user that designation for using the encryption function for the print job and the storage function for the print job together is not permitted when the first detecting step and the second detecting step detects that both the use of the encryption function for the print job and the use of the storage function for the print job are designated,
wherein the information processing apparatus executes the designating step, the first detecting step, the second detecting step, and the restriction step.

20. A control method as claimed in claim 19, further comprising:
a determining step of determining whether or not the output processing apparatus has the decryption function; and
a disabling step of disabling the storage function when the determining step determines that the output processing apparatus has the decryption function,
wherein the information processing apparatus executes the determining step and the disabling step.

21. A control method as claimed in claim 19, further comprising:
- a designation inhibiting step of inhibiting said designating step from designating the use of the storage function for the print job when the first detecting step detects that the use of the encryption function for the print job is designated,
- wherein the information processing apparatus executes the designation inhibiting step.

22. A control method as claimed in claim 19, further comprising:
- a designation inhibiting step of inhibiting said designating step from designating the use of the encryption function for the print job when the second detecting step detects that the use of the storage function for the print job is designated,
- wherein the information processing apparatus executes the designation inhibiting step.

23. A control method as claimed in claim 19, further comprising:
- a restricting step of restricting from issuing, from the information processing apparatus to the output processing apparatus, the print job when the first detecting step and the second detecting step that detects both the use of the encryption function for the print job and the use of the storage function for the print job are designated in the designating step,
- wherein the information processing apparatus executes the restricting step.

24. A non-transitory computer-readable medium storing a computer program for controlling an information processing apparatus that has an encryption function of encrypting print data, and issues a print job for the print data encrypted by the encryption function, the information processing apparatus being connected to an output processing apparatus that receives the issued print job, and has a decryption function of decrypting the encrypted print data of the received print job, and an output apparatus that has a storage function of storing the print data not encrypted by the encrypting function, and outputs the stored print data, the computer program comprising:
- a designating module configured to permit a user to designate use of the encryption function and use of the storage function for the print job;
- a first detecting module configured to detect whether or not the use of the encryption function for the print job is designated;
- a second detecting module configured to detect whether or not the use of the storage function for the print job is designated; and
- a notifying module configured to notify a user that designation for using the encryption function for the print job and the storage function for the print job together is not permitted when it is detected that both the use of the encryption function for the print job and the use of the storage function for the print job are designated.

* * * * *